United States Patent [19]
Leib et al.

[11] Patent Number: 4,703,994
[45] Date of Patent: Nov. 3, 1987

[54] SYSTEM AND METHOD FOR AUTOMATICALLY FABRICATING MULTI-HOLOGRAM OPTICAL ELEMENTS

[75] Inventors: Kenneth G. Leib, Wantagh; Alexander N. Peck, II, Rye; Suey Jue, Hicksville, all of N.Y.

[73] Assignee: Grumman Aerospace Corporation, Bethpage, N.Y.

[21] Appl. No.: 843,091

[22] Filed: Mar. 24, 1986

[51] Int. Cl.$^4$ .............................................. G03H 1/26
[52] U.S. Cl. ..................... 350/375; 350/3.6; 350/3.77
[58] Field of Search ...................... 350/3.6, 3.66, 3.75, 350/3.85, 3.86

[56] References Cited

U.S. PATENT DOCUMENTS

| | | | |
|---|---|---|---|
| 3,400,363 | 9/1968 | Silverman | 350/3.66 |
| 3,492,652 | 1/1970 | Heerden | 340/173 |
| 3,494,698 | 2/1970 | Neumann | 350/3.5 |
| 3,531,589 | 9/1970 | Collier et al. | 350/3.5 |
| 3,541,252 | 11/1970 | Collier et al. | 350/3.5 |
| 3,572,882 | 5/1971 | Neumann | 350/3.5 |
| 3,659,947 | 5/1972 | Neumann | 350/3.5 |
| 3,675,983 | 7/1972 | Macchia | 350/162 |
| 3,698,787 | 10/1972 | Mueller et al. | 350/3.5 |
| 3,698,789 | 10/1972 | Wolber | 350/3.66 |
| 3,744,871 | 7/1973 | Takeda et al. | 350/3.5 |
| 3,820,869 | 6/1974 | Bolusset et al. | 350/3.5 |
| 4,094,011 | 6/1978 | Nagao | 350/3.82 |
| 4,164,788 | 8/1979 | Jain | 364/525 |
| 4,213,193 | 7/1980 | Reid et al. | 350/3.77 |
| 4,317,610 | 3/1982 | Breglia et al. | 350/3.77 |
| 4,320,462 | 3/1982 | Lund et al. | 364/525 |
| 4,336,976 | 6/1982 | Rodemann et al. | 350/3.75 |

FOREIGN PATENT DOCUMENTS

2247801 4/1973 Fed. Rep. of Germany ........ 350/3.5

OTHER PUBLICATIONS

"Shearing Interferometer with Scanned Photodiode Array and Microcomputer for Automatic Transparency Distortion Measurements" by J. Taboada and A. J. Duelm, SPIE, vol. 153, Advances in Optical Metallurgy (1978), pp. 139–145.

"Holographic Disk with High Data Transfer Rate: its Application to an Audio Response Memory," by K. Kubota, Y. Ono, M. Kondo, S. Sugama, N. Nishida, and M. Sakaguchi, Applied Optics, vol. 19, No. 6, Mar. 15, 1980, pp. 944–951.

"Aerial Reconnaissance Film Screening Using Optical Matched-Filter Image-Correlator Technology" by Kenneth G. Leib, Robert A. Bondurant, Stephen Hsiao, Ron Wohlerss, and Ron Herold, vol. 17, No. 18, Applied Optics (1978), pp. 2892–2899.

"A Real-Time Hybrid Optical System for Pattern Recognition Applications" by Silverio P. Almeida, James Kim-Tzong Eu, and Peichung F. Lai, vol. IM-26, No. 4, Dec. 1977, IEEE Transactions on Instrumentation and Measurement, pp. 312–315.

"A Two-Dimensional Diffraction Pattern Sampling System for Determining the Optimum Parameters of a Matched Spatial Filter", S. Jutamulia, H. Fujii, and T. Asakura, Optics and Laser Technology, Apr. 1983, pp. 101–104.

(List continued on next page.)

Primary Examiner—Bruce Y. Arnold
Assistant Examiner—Martin Lerner
Attorney, Agent, or Firm—Scully, Scott, Murphy & Presser

[57] ABSTRACT

A system and method for automatically fabricating multi-hologram optical elements. Signal and reference beams are formed and directed along separate paths that intersect at a recording medium; and a gate is moved through a first sequence to expose a plurality of views, one at a time, to the signal beam to spatially modulate that beam. A matrix of beams, each of which converges toward a different area of the recording medium, is generated from the spatially modulated signal beam, and a mask is moved through a second sequence to pass the matrix beams onto the recording medium to record a plurality of diffraction patterns thereon.

23 Claims, 13 Drawing Figures

OTHER PUBLICATIONS

"A Microcomputer-based Hybrid Processor at the University of California, San Diego", by James R. Leger, Jack Cederquist and Sing H. Lee, vol. 21, No. 3, May/Jun. 1982, Optical Engineering, pp. 557-564.

"One-Board Microcomputer-Controlled Fabrication System for Holographic Matched Spatial Filters", by S. Jutamuia, H. Fujii and T. Asakura, The Institute of Physics, (1982), pp. 1227-1230.

"A Microprocessor-Controlled Laser Grating System for Laser Tuning", by H. Daneshvar-Hosseini, D. L. Begley, H. R. Heidar and L. D. Coraor, Optics and Laser Technology, Jun. 1982, pp. 137-142.

SYSTEM AND METHOD FOR AUTOMATICALLY FABRICATING MULTI-HOLOGRAM OPTICAL ELEMENTS

BACKGROUND OF THE INVENTION

This invention generally relates to systems and methods for constructing holographic optical elements, and more particularly to systems and methods for automatically recording multi-hologram optical elements.

In the construction of holographic optical elements, a pair of collimated construction beams are projected so that they overlap, at a relative angle to each other, on a recording medium, producing an optical interference pattern that is recorded in the medium as an amplitude or phase distribution of closely spaced lines. Preferably, the construction beams are from the same source of coherent electromagnetic radiation, which, for example, may be a laser. The recording medium, as is well known, can be photographic emulsion, dichromated gelatin, a photopolymer, and the like, and can be coated or mounted on a suitable substrate such as a glass plate, a thin film, or the like.

Matched filters are one type of a holographic optical element that are used in optical correlator systems to detect the presence of a selected target in a scene or a field of view. To construct a matched filter, one of the construction beams, referred to as the signal beam, is spatially modulated by passing it through an image of the selected target, and then a lens performs an optical Fourier Transform operation on the modulated signal beam. The two construction beams then combine at the recording medium to produce a Fourier Transform hologram or matched filter, unique to the selected target. When the filter is used in a correlator system, a coherent light beam is passed through a view, which may include the selected target, Fourier transformed, and then transmitted through the matched filter and through an inverse transform lens. If the selected target is not present in the view, the output of the matched filter is relatively weak and diffused, and that output remains diffused as it passes through the inverse transform lens. However, if the suspected target is present in the submitted view, the light traversing the matched filter becomes collimated, and the inverse transform lens brings the output beam from the matched filter to a focus. A light sensitive detector is located at the focal point of the inverse transform lens; and when light of a sufficient intensity is focused on that detector, an output signal is produced. This output signal is used to trigger some type of device, which, depending on the apparatus in which the target recognition system is used, might be a simple alarm or a complex robotic guidance system, for example.

For many applications, it is beneficial to form multiple holograms on one recording medium. For example, because very little space is required on the matched filter plate in order to store a hologram, it is possible to construct a matched filter memory having an array of many holograms, which may represent different targets or different views of the same target. Such a matched filter memory is useful in an optical correlator system to identify a multitude of targets or to identify a target independent of the angle from which it is viewed. A matched filter memory having an array or library of holograms may be formed on one recording medium by presenting different views, one at a time, to the signal beam used to construct the filter, and changing the position on the recording medium exposed to that signal beam as the different views are presented to the signal beam.

Heretofore, optical systems have not been designed to automatically manufacture multiple holograms on individual recording mediums; and, instead, a significant amount of work by operating personnel, for example, to substitute one view for another or to change the position of the recording medium exposed to the modulated signal beam, has been required to form an array or overlap of holograms on a single recording medium. This necessary adjustment of various parts of the optical system is time consuming and often imprecise, especially so since the adjustments are normally done in the dark, or at best in very low levels of light, to minimize any undesirable exposure of the recording medium.

SUMMARY OF THE INVENTION

An object of this invention is to provide a swift, accurate and repeatable cycle for manufacturing images on a holographic recording medium.

Another object of the present invention is to automatically manufacture different holograms on the same holographic recording medium, either by overlapping the holograms or forming them on different areas on the recording medium.

A further object of this invention is to automatically control a gate of an optical recording system to expose a plurality of views, in accordance with a preset program, to the signal beam of the recording system.

Still another object of the present invention is to automatically coordinate movement of a control mask of a holographic recording system to pass different beams onto a recording medium as different views are exposed to the signal beam of the recording system.

These and other objects are attained with a system for automatically fabricating multi-hologram optical elements, comprising means to form signal and reference beams of phase-related coherent radiation and to direct the signal and reference beams, respectively, along first and second paths that intersect at a recording plane, and an optical recording medium located at that recording plane. This system also includes gate means located in the path of the signal beam to expose a plurality of views to the signal beam to spatially modulate that beam; and holographic lens means located in the path of the signal beam, between the gate means and the recording medium, to generate a matrix of beams from the signal beam. Each of the beams of this matrix converges toward a different area on the recording medium; and a mask is located in the path of these beams, between the holographic lens means and the recording medium, and includes a control aperture to pass one of the beams of the matrix through the mask and onto the recording medium to record thereon the diffraction pattern produced between the passed matrix beam and the reference beam.

Means are provided to move the mask through a plurality of positions in a first sequence to pass the matrix beams through the control aperture and onto the recording medium to record a plurality of diffraction patterns on different areas thereof; and means are provided to move the gate through a plurality of positions in a second sequence to expose the plurality of views, one at a time, to the signal beam. Preferably, this system further includes system control means connected to and actuating the gate and the mask moving means so that the gate is moved to different positions in the second sequence at predetermined times in the first sequence. In a particularly preferred embodiment, this system control means actuates the mask and gate moving means so that the gate is moved to a different position in the second sequence and exposes a different view to the signal beam each time the mask is moved to a different position in the first sequence. In this particularly preferred system, the mask is used to block from the recording medium all but the one matrix beam passing through the control aperture.

A system constructed according to this invention may be operated in a number of different ways. For example, a plurality of views of a single object may be exposed one at a time to the signal beam, without moving the mask, to form a plurality of non-coherent holograms on a single area on the recording medium; or one view of a plurality of objects may be exposed to the signal beam to form a plurality of coherent holograms on a particular area on the recording medium. Each of these procedures may be repeated a number of times, each time with the mask in a different position, to form an array of such non-coherent or ccherent holograms on the recording medium. Also, a different hologram may be made on a different area on the recording medium for each object presented to the signal beam.

Further benefits and advantages of the invention will become apparent from a consideration of the following detailed description, given with reference to the accompanying drawings, which specify and show preferred embodiments of the invention.

A DETAILED DESCRIPTION OF THE PREFERRED EMBODIMENTS

Figure 1:
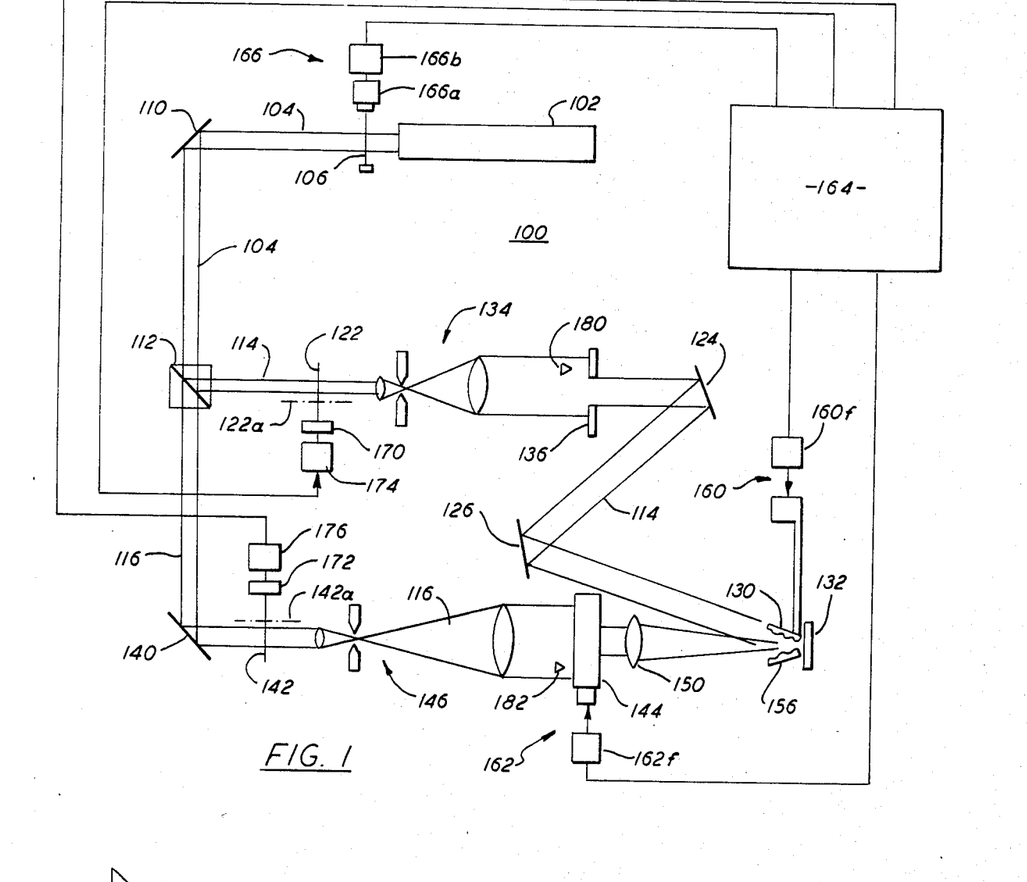
FIG. 1 is a schematic diagram of a system for constructing optical memories in accordance with this invention.

With reference now to the drawings, FIG. 1 shows a preferred optical system 100 illustrating teachings of this invention. A source of monochromatic collimated light energy of substantially fixed wave length such as a laser 102 produces an output beam 104, referred to as the source beam, and directs that beam through shutter 106 and to mirror 110. Laser 102 preferably is of the gaseous type such as an argon ion laser producing a continuous output at a wavelength near 5,000 angstroms, but suitable lasers of other types such as a yttrium aluminum garnet (YAG) or helium-neon continuous wave lasers, a carbon dioxide laser or a pulsed laser can also be employed. It will be understood, of course, that irrespective of the type of radiation source employed, the radiation source has a sufficiently high level of output power.

Mirror 110 reflects source beam 104 to a first optical element which is, preferably, a beam splitter 112 that splits the source beam into first and second output beams 114 and 116, referred to as the reference and signal beams respectively. Reference beam 114 is directed from beam splitter 112, through variable attenuation filter 122, and onto mirror 124. Mirror 124 reflects beam 114 onto mirror 126 that in turn reflects the reference beam through mask 130 and onto recording medium 132. Beam expansion means 134 and beam reduction means 136 may be located in the path of reference beam 114 to adjust the size thereof.

Signal beam 116 from optical element 112 is reflected off mirror 140 and passed through variable attenuation filter 142, and then through gate 144, which is provided to expose a plurality of views to the signal beam to spatially modulate that beam. These views may be, for instance, images of different objects, or different views of the same object; and beam expansion means 146 may be located in the path of signal beam 116 to insure that the complete area of the image or view on the gate is illuminated by the signal beam. The modulated beam from gate 144 is then directed to a second optical element, which preferably is a multiple beam generating holographic lens 150.

Figure 2:
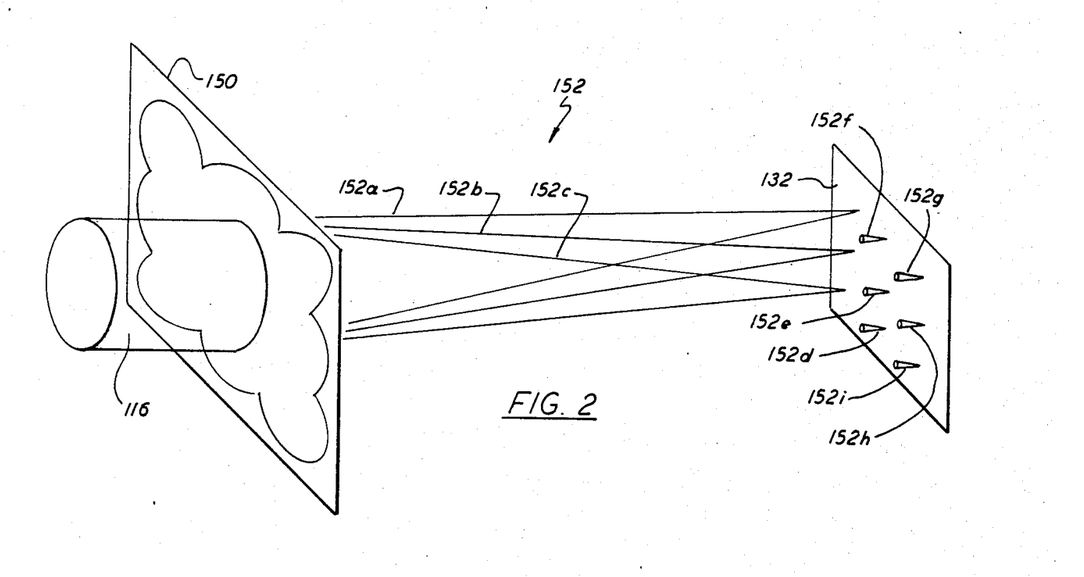
FIG. 2 is an enlarged view of a portion of FIG. 1, schematically showing in detail the output of the multiple beam generating holographic lens thereof.

With particular reference to FIG. 2, lens 150 replicates manyfold the incoming signal beam, and the output of the holographic lens is a matrix 152 of individual beams 152a–i, each of which is spatially modulated in the same way as the beam incident on the lens. These matrix beams 152a–i have parallel axes and converge toward different areas of recording medium 132. The holographic lens is small, light, and particularly useful because of the large number of identical beams that it can generate. For purposes of explaining the present invention, the output of holographic lens 150 is shown to be a 3×3 matrix of identical beams, but this is not to be considered as a limitation of the invention in any way. Mask 130 (shown in FIGS. 1 and 3, but not shown in FIG. 2) is located in the path of the matrix 152 of output beams from holographic lens 150, between that lens and recording medium 132, and the mask includes control aperture 156 to pass one of the matrix beams 152a–i through the mask and onto the recording medium. At medium 132, the passed beam interferes with reference beam 114 to produce a diffraction pattern that is recorded on the recording medium.

In accordance with the present invention, means 160 are connected to mask 130 to move the mask through a plurality of positions in a first sequence to pass the matrix beams 152a–i through control aperture 156 and onto recording medium 132 to record a plurality of diffraction patterns on different areas thereof; and means 162 are connected to gate 144 to move the gate through a plurality of positions in a second sequence to expose the plurality of views, one at a time, to signal beam 116.

Figure 4:
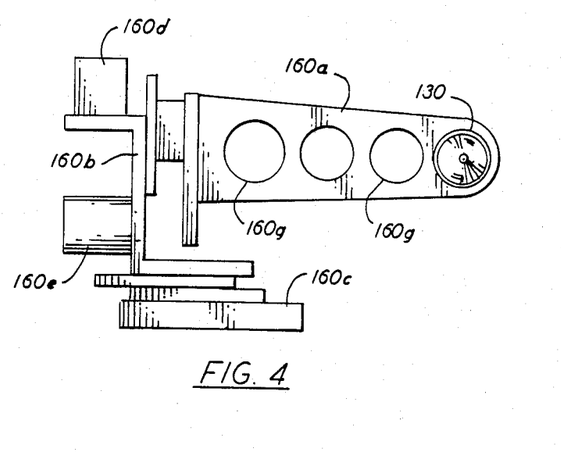
FIG. 4 is a simplified view showing one apparatus for supporting and moving the control mask.

As will be appreciated, numerous arrangements may be used to move mask 130 in the above-described manner. For example, FIG. 4 represents one arrangement where mask 130 is mounted on an arm 160a that is supported by a frame 160b for movement along a first axis, for example a vertical axis; and that frame is itself supported by a base 160c or similar structure for movement along a second axis, such as a horizontal axis. A first stepper motor 160d is supported by frame 160b and connected to arm 160a in any suitable manner to move the arm and mask 130 along that first axis through a plurality of discrete, spaced apart positions; and second stepper motor 160e is supported by frame 160b and connected to base 160c via any acceptable drive mechanism to move the frame 160b, and thus mask 130, along the second axis through a plurality of discrete spaced apart positions. Electronic control 160f (shown in FIG. 1) may be connected to motors 160d and 160e to generate the electric pulses to operate those motors. Control 160f, in turn, may be programmed or controlled in any suitable manner, and a preferred control arrangement is described below in detail. A plurality of openings 160g may be formed in arm 160a to decrease the weight thereof.

Preferably, stepper motor 160e is used to move mask 130 in just one direction as the mask is moved through its sequence of positions. This procedure eliminates the lost motion that would occur if stepper motor 160e were used alternately to pull and push mask 130 across the path of matrix beams 152a–i, and thus helps to hold the mask precisely in desired positions. Also, it should be noted that, with the above-described apparatus, the orientation of mask 130 does not change relative to the direction of the force of gravity. In this way, gravity has minimal interference with movement of mask 130 through its sequence of positions, further helping to position and to hold the mask precisely in preferred locations.

Figure 3:
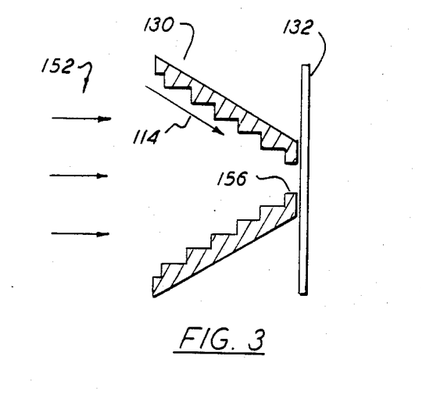
FIG. 3 is an enlarged side view of the control mask shown in FIG. 1.

As shown in FIGS. 1 and 3, mask 130 has only one control aperture 156; and preferably the mask is used to pass the matrix beams 152a–i one at a time through the control aperture and onto recording medium 132, and to block from the recording medium all but the one matrix beam passing through the control aperture. Mask 130 may, though, have a plurality of apertures to pass simultaneously a number of the beams of matrix 152. Also, as represented in FIGS. 1 and 3, preferably mask 130 has a conical shape and the inside surface of the mask includes a plurality of steps. This arrangement helps to diffuse the beams of matrix 152 that are not passed through mask 130 so that those non-passed beams do not reflect off the mask and interfere with the beam being passed through the mask, while at the same time allowing sufficient open space for reference beam 114 to pass through the mask and onto recording medium 132.

Mask 130 may be moved in a number of different ways to pass matrix beams 152a–i through control aperture 156 and onto recording medium 132. With a particularly preferred pattern, as best understood from FIGS. 2 and 3, the first position of mask 130 is such that control aperture 156 is aligned with matrix beam 152a and passes that beam to recording medium 132; and the mask is then moved vertically downward through second and third positions to align the control aperture with matrix beams 152b and 152c, respectively, to pass those beams to the recording medium. Thereafter, mask 130 is pushed horizontally to align control aperture 156 with beam 152d to pass that beam onto recording medium 132, and then the mask is moved vertically upward through fifth and sixth positions to align the control aperture with matrix beams 152e and 152f, respectively, to pass those beams to the recording medium. From its sixth position, mask 130 is pushed horizontally to align control aperture 156 with beam 152g to pass that beam to recording medium 132; and after this, the mask is again moved vertically downward through eighth and ninth positions to align the control aperture with beams 152h and 152i, respectively, to pass those beams through the mask and onto the recording medium. After mask 130 has completed this sequence, the mask may be returned to its first position to prepare the mask to repeat the above-described sequence of movements.

Preferably, however, before locating mask 130 in that first position, the mask is moved to a position, referred to as the zero or initial position, that is slightly spaced from the above-described first position, and the mask is thereafter moved from that initial position to the first position in its sequence This is done to take up any lost motion between stepper motor 160e and mask 130 that occurs as the mask is returned from the last position in its sequence to its first position therein. For example, FIG. 4 shows mask 130 in the first position in its sequence, and the initial position of the mask may be to the left of the position of the mask shown in FIG. 4; and stepper motor 160e may be used to push the mask to the right, as viewed in FIG. 4, from that initial position to the position of the mask in FIG. 4.

Various specific arrangements may also be used to move gate 144 in its own sequence to expose a plurality of views, one at a time, to signal beam 116. For example, with reference to FIG. 5, gate 144 may be a rotating gate 144a including stationary frame 144b and rotatable plate 144c. Plate 144c includes central opening or window 144d for holding a picture (not shown) of a selected view or object, and the plate is supported by frame 144b for rotation about the axis of that central opening. Stepper motor 162a is supported by frame 144b and connected to plate 144c via any suitable drive mechanism (not shown) to rotate the plate, and thus the picture held in opening 144d, about the axis of that opening, through a plurality of discrete angular steps, which preferably all equal the same angle such as 40°. Such an arrangement is particularly useful for developing diffraction patterns on recording medium 132 representing different angular views of the same object.

Figure 5:
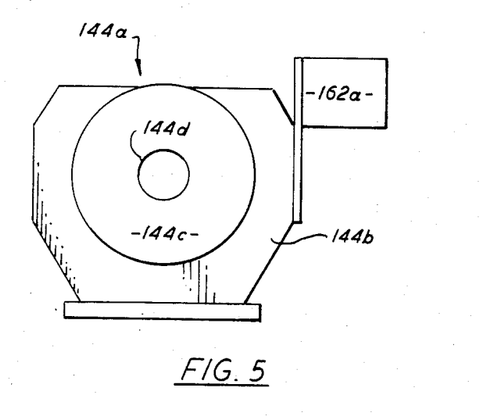
FIG. 5 is a simplified front view of a rotating gate that may be used in the system of FIG. 1.
Figure 6:
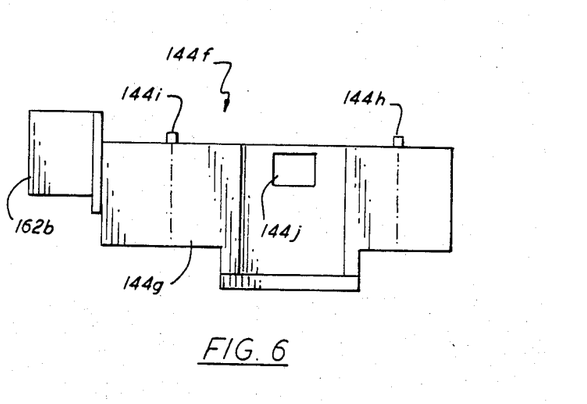
FIG. 6 is a simplified view showing a linear gate which also may be used in the system of FIG. 1.

With an alternate embodiment shown in FIG. 5, gate 144 is a linear gate 144f including housing 144g and first and second rotatable spools 144h and 144i located therein. A film (not shown) is wound around first spool or roller 144h, and one end of the film is connected to the second, or take-up, spool or roller 144i. Stepper motor 162b is supported by housing 144g and connected to this take-up roller 144i by any suitable drive connection (not shown) to rotate that roller and advance the film transversely in a plurality of discrete steps past housing window 144j and across the path of signal beam 116. Rotatable linear gates are also known in the art and may be used in the practice of this invention.

With each of the above-described embodiments of gate 144, electronic control 162f (shown in FIG. 1) may be employed to generate the electric pulses that operate the stepper motor used to move the gate. Control 162f may be controlled or programmed in any suitable way, and one preferred program is discussed below in detail. Moreover, with each embodiment of gate 144, preferably, the stepper motor used to move the gate is connected thereto to maintain a slight tension on the gate in the direction in which the gate is advanced through its sequence of positions. This minimizes, and ideally prevents, any lost motion between the gate and the stepper motor as the gate moves through its sequence of positions, producing a very precise positioning of the different views in the path of the signal beam.

Preferably, system 100 further includes system control means 164 connected to and actuating mask positioning means 160 and gate positioning means 162 to move gate 144 to a different position in its sequence of positions at predetermined times in the sequence of positions of mask 130. With the preferred embodiment of the invention illustrated in FIG. 1, system control means 164 actuates mask and gate positioning means 160 and 162 by generating electric pulses that are conducted to electronic controllers 160f and 162f. In response to receiving these pulses, controllers 160f and 162f generate their own electric pulses, and these latter pulses are conducted to the appropriate stepper motors to move mask 130 and gate 144 through the desired coordinated patterns.

The predetermined times in the sequence of positions of mask 130 at which gate 144 is located in different positions in its own sequence may occur anywhere in the former sequence. However, preferably system control means 164 actuates mask and gate positioning means 160 and 162 so that gate 144 is located in a different position in its sequence and exposes a different view to signal beam 116 each time mask 130 is moved to a different position in its sequence. In this way, different diffraction patterns representing the different views exposed to signal beam 116 by gate 144 are recorded on different areas of the recording medium.

Figure 7:
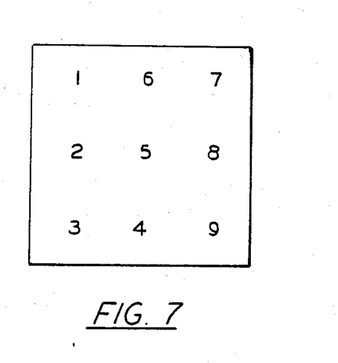
FIG. 7 is a chart showing one sequence for passing the matrix beams shown in FIG. 2 onto a recording medium.
Figure 8:
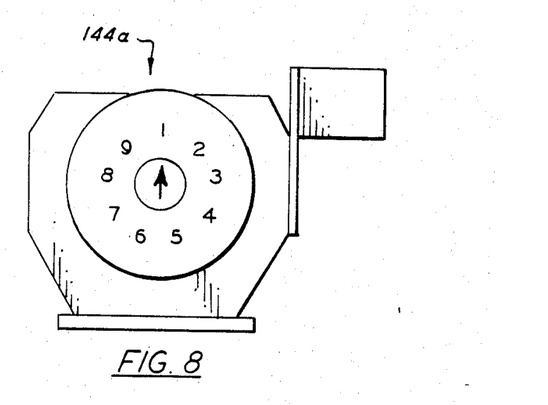
FIG. 8 is a schematic diagram indicating nine different positions in which the gate of FIG. 5 may be located.

This preferred coordination between mask 130 and gate 144 may be best understood with reference to FIGS. 1-5, 7 and 8. FIG. 2, as previously explained, schematically shows the matrix of beams 152a-i produced by lens means 150 after signal beam 116 has been modulated by the view presented thereto by gate 144. FIG. 7 is a chart showing one sequence, represented by the numbers "1" to "9", for passing matrix beams 152a-i through mask 130 and onto recording medium 132, and this may be done by moving the mask through the sequence of positions discussed above in connection with FIG. 4. FIG. 8 is a schematic view of rotatable gate 144a shown in FIG. 5, with the gate having a picture of an arrow in the central opening of the gate, and with the numbers "1" to "9" shown around that arrow to indicate a sequence of nine different positions of the gate. Specifically, when gate 144a is in it first position, the arrow on the gate points directly to the "1," and when the gate is in its second position, the arrow points directly to the "2." Analogously, when gate 144a is in its third through ninth positions, the arrow points directly to the "3" through "9" respectively of FIG. 8.

In the preferred operation of system 100, mask 130 and gate 144 are located in the first positions in their respective sequences, exposing a first view to the signal beam and passing first matrix beam 152a to recording medium 132. This matrix beam 152a converges on a first area of recording medium 132; and after a first diffraction pattern representing that first view is recorded on the recording medium, mask 130 and gate 144 are moved to second positions in their sequences. Gate 144 exposes a second view to signal beam 116 and mask 130 passes second matrix beam 152b onto recording medium 132. This matrix beam 152b converges on a second area of recording medium 132; and after the diffraction pattern representing that second view is recorded thereon, gate 144 and mask 130 are moved to third positions in their sequences. Gate 144 exposes a third view to signal beam 116 and mask 130 passes a third matrix beam 152c onto recording medium 132 so that a third diffraction pattern is recorded on a third area thereof. This pattern is repeated until the desired number of views are exposed to signal beam 116 and the desired number of diffraction patterns are recorded on recording medium 132.

As will be apparent to those of ordinary skill in the art, it is not necessary that mask 130 and gate 144 move simultaneously between positions in their respective sequences, nor is it necessary that a particular one of these elements of systems 100 move before the other one. Moreover, it is not necessary to the practice of this invention in its broadest sense that gate 144 be in a different position each time mask 130 is in a different position. For example, gate 144 may be moved to a different position each time mask 130 moves a selected number of positions. This would produce a number, equal to that selected number, of identical diffraction patterns on recording medium 132 for each view exposed to signal beam 116.

Likewise, if desired, gate 144 could be moved through a selected number of positions for each position of mask 130. With this operation, a number, equal to that selected number, of non-coherently added diffraction patterns are formed on recording medium 132. Furthermore, without departing from the scope of this invention, system 100 may be provided with a control mask 130 having a plurality of control apertures 156 to pass simultaneously a plurality of the matrix beams 152a-i onto recording medium 132. Such a control mask may be used to produce a plurality of identical diffraction patterns on recording medium 132 for each view exposed to beam 116.

If the same area on the recording medium 132 is exposed at different times to different diffraction patterns, it may be desirable to increase the length of time (referred to as the exposure time) the recording medium is exposed to each successive diffraction pattern in order to form those patterns on the recording medium with equal densities. If system 100 is operated in this way, preferably the different diffraction patterns are linearly superimposed, one over the other, on that area on the recording medium. To elaborate, the ratio of the amount of light energy passing through a recording medium to the amount of light energy incident thereon is related to the total amount of light energy to which the medium has been exposed. This relationship can be expressed as: $\tau = f(E)$, where $\tau$ is the above-described ratio, and E is the total amount of light energy to which the recording medium has been exposed. As is understood in the art, when E is within a certain range, $\tau$ changes linearly or substantially linearly with E; however $\tau$ often changes non-linearly with E when E is outside that range. It is much easier to determine the preferred exposure times for successive exposures of the same area on recording medium 132 to successive diffraction patterns if the total light energy to which the recording medium has been exposed is within that certain range where $\tau$ changes linearly or substantially linearly with E, producing an operation referred to as linear superimposition of the different diffraction patterns.

Shutter 106 is used to selectively prevent reference and signal beams 114 and 116 from passing to recording medium 132. This is done, first, to control the length of time that recording medium 132 is exposed to those beams 114 and 116, and also to block the signal beam from gate 144 as the view that is located in the path of the signal beam is being changed. Shutter 106 may be a conventional photographic shutter having an open position for passing light through the shutter, and a closed position for blocking the passage of light through the shutter. Shutter control means 166 may be provided to move shutter 106 between these open and closed positions; and this shutter control means may include electric solenoid 166a directly connected to the shutter, and electronic control 166b that generates an electric current to operate solenoid 166a. Preferably, system control means 164 is also connected to shutter control means 166, and specifically to electronic control 166b, to generate and conduct electric pulses thereto to cause control 166b to operate solenoid 166a, and thus shutter 106, in accordance with a preset program.

The use of shutter 106 is not essential to the practice of this invention in its broadest sense, and, for example, laser 102 may be selectively actuated and deactuated to control the passage of reference and signal beams 114 and 116 through system 100. Repeatedly activating and deactivating laser 102, however, is a relatively time consuming task, while shutter 106 may be operated quickly to selectively pass the reference and signal beams 114 and 116 through system 100. Thus, the use of shutter 106 helps to increase the speed at which system 100 operates.

The effectiveness of various holographic optical elements for particular applications depends, in part, on the ratio of the intensities of the reference and signal beams used to form the holographic element; and for different such elements, optimum results for particular applications are obtained with different ratios. System 100 is preferably provided with filters 122 and 142 to adjust the intensities of reference and signal beams 114 and 116 to keep the ratio of those intensities at a value that produces optimum results. Various types of variable attenuation filters are known in the art and may be used in the practice of this invention.

For example, each filter 122 and 142 may comprise a circular glass plate having a density that varies in an annular or circumferential direction around the center of the plate. Plate 122 is supported for rotation about an axis 122a that is parallel to and spaced from reference beam 114, and a portion of that plate extends directly into the path of the reference beam. Stepper motor 170 is connected to plate 122 to rotate that plate about axis 122a through discrete angular steps, to thereby change the portion of the plate directly in the path of reference beam 114 and, in this way, vary the extent to which the plate attenuates the intensity of the reference beam. Similarly, plate 142 is supported for rotation about an axis 142a that is parallel to and spaced from the path of signal beam 116, and a portion of that plate extends directly into the path of the signal beam. Stepper motor 172 is connected to plate 142 and used to rotate that plate about axis 142a, through discrete angular steps, to thereby change the portion of the plate directly in the path of signal beam 116 and, hence, vary the extent to which the plate attenuates the intensity of the signal beam.

Preferably, stepper motors 170 and 172 may be used to rotate plates 122 and 142 both clockwise and counterclockwise, and any suitable drive gears (not shown) may be used to connect the stepper motors to the plates. Electronic controllers 174 and 176 may be provided to generate electric pulses that are conducted to stepper motors 170 and 172, respectively, to control operation of those motors. As will be understood by those of ordinary skill in the art, the ratio of the intensities of the reference and signal beams 114 and 116 may be changed by varying the intensity of only one of those beams. However, preferably two variable filters are provided in system 100 to increase the range over which that ratio may be adjusted. Also, with the two filters 122 and 142, the total intensity of the light incident on recording medium 132 may be changed while keeping constant the ratio of the intensities of the reference and signal beams.

With the embodiment of the invention illustrated in FIG. 1, sensors 180 and 182 are located in the paths of reference and signal beams 114 and 116 respectively to sense, and to produce signals indicating, the intensities of the reference and signal beams. Further, system control means 164 of this preferred system 100 is connected to sensors 180 and 182 to receive those signals therefrom, and also connected to electronic controllers 174 and 176 to adjust the intensities of reference and signal beams 114 and 116 automatically according to a preset plan. For example, sensors 180 and 182 may be light sensitive crystals that produce electric potentials directly related to the intensities of the light incident thereon; and, in use, system control means 164 compares the voltage potentials produced by those sensors and, if necessary, generates an output current and directs that current to one or both of electronic controllers 174 and 176 to change the intensities of either or both of reference and signal beams 114 and 116.

Various routines may be employed to move filters 122 and 142 to adjust the ratio of the intensities of reference and signal beams 114 and 116. For example, this ratio may be increased up to a certain value by directing electric pulses to controller 174 to increase the intensity of reference beam 114. After this certain value has been reached, the above-identified ratio may be further increased by directing electric pulses to controller 176 to decrease the intensity of signal beam 116. The design and implementation of specific routines to operate controllers 174 and 176 and stepper motors 170 and 172 in accordance with the above procedure, or others that also effectively vary the ratio of the intensities of reference and signal beams 114 and 116, are well within the ability of those of ordinary skill in the art.

Figure 9:
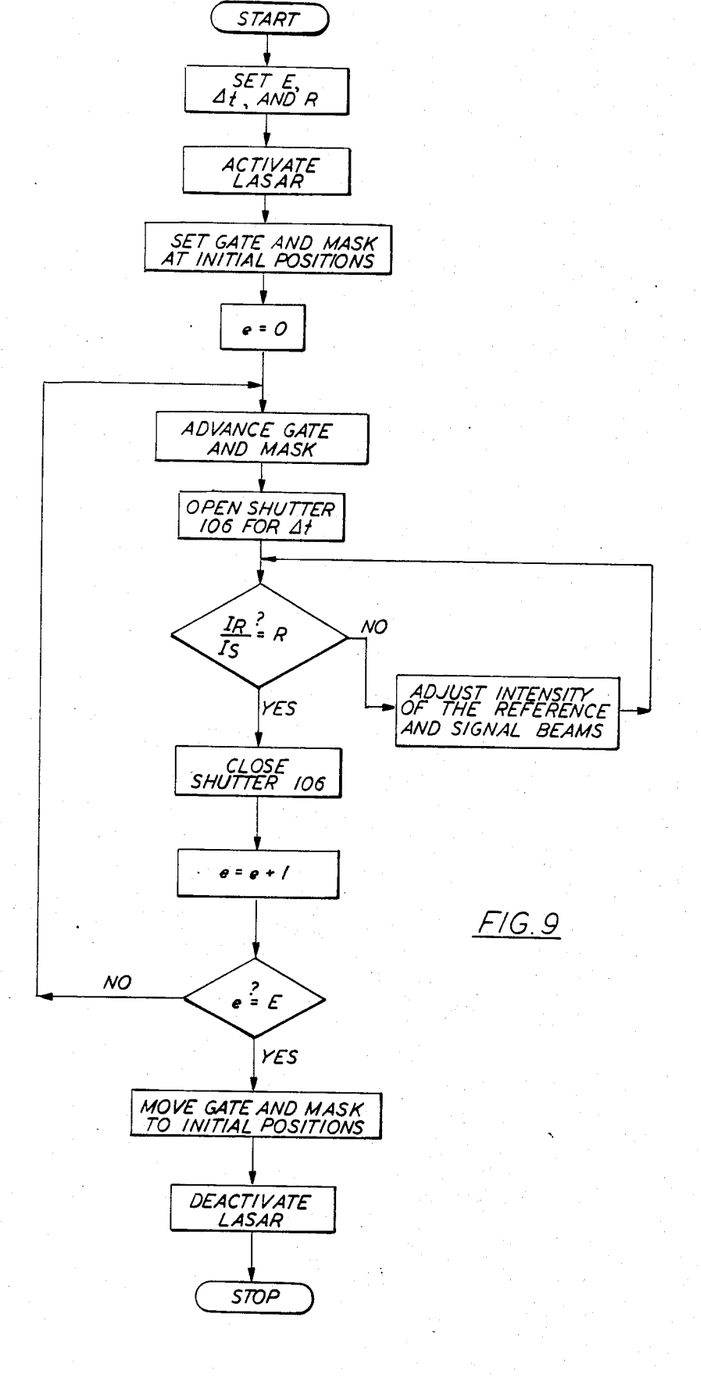
FIG. 9 is a flow chart illustrating one method for operating the system of FIG. 1.

Preferably, a microprocessor is employed as system control means 164. This microprocesser is connected to sensors 180 and 182 to receive input signals therefrom, and to electronic controllers 160f, 162f, 166b, 174 and 176 to conduct output control signals thereto; and the microprocessor is programmed to coordinate automatically movement of gate 144, mask 130 shutter 106 and filters 122 and 142. A flow chart of one program to do this is shown in FIG. 9; and this program involves six variables identified as E, e, $\Delta t$, $I_r$, $I_s$ and R. E is an externally set parameter that determines the total number of exposures recorded on recording medium 132, and e is an internal counting variable that keeps track of the number of exposures that have been recorded on the recording medium. $\Delta t$ is another externally set value that determines the length of time the recording medium is exposed to individual matrix beams 152a–i. $I_r$ and $I_s$ are variables representing the intensities of reference and signal beams 114 and 116 respectively, and R is a third externally set parameter equal to the desired ratio of those intensities.

Various steps in the program represented by the flow chart of FIG. 9 are identified by number immediately to the left of the flow chart. Prior to beginning this program, shutter 106 is closed and laser 102 is de-activated; and the first steps in the program represented by FIG. 9 are to set E, $\Delta t$ and R at selected values, to activate the laser, to set gate 144 and mask 130 at their initial positions, and to set e equal to zero. Step 5 shown in FIG. 9 is to advance gate 144 and mask 130 to the next positions in their sequences. For example, mask 130 may be moved from the initial position, discussed above with reference to FIG. 4, to the first position in its sequence. Once gate 144 and mask 130 are set in their new positions, shutter 106 is opened for the predetermined length of time $\Delta t$.

When this happens, signal beam 116 passes through an image on gate 144 and through lens means 150, and one of the matrix beams 152a–i passes through control aperture 156 and onto recording medium 132. At the same time, reference beam 114 passes from beam splitter 112 through control aperture 156, and onto recording medium 132 so that the signal and reference beams interfere with each other at a first area on the recording medium. The diffraction pattern produced by that interference is recorded on that area of recording medium 132 over the period $\Delta t$; and after that period passes, shutter 106 is closed. $\Delta t$ is chosen so that shutter 106 is open for a sufficient length of time to develop a suitable recording of the diffraction pattern on recording medium 132.

In addition, while shutter 106 is open, the program moves on to steps 7 and 8 shown in FIG. 9, and the ratio of the intensities of reference and signal beams 114 and 116 is compared to R. If this ratio is not equal to R, the intensity of one or both of reference and signal beams 114 and 116 is adjusted to bring that ratio closer to or equal to R. For instance, if the ratio of the intensities of reference and signal beams 114 and 116 is greater than R, one electric current pulse may be conducted from microprocessor 164 to motor controller 174 to cause that controller to generate and conduct an electric pulse to stepper motor 170 to advance variable density filter 122 one angular step to decrease the intensity of the reference beam. From step 8, the program returns to step 7 and recompares the ratio of the intensities of reference and signal beams 114 and 116, and steps 7 and 8 are repeated until that ratio equals, or comes within a certain range of, R.

After shutter 106 has been open for $\Delta t$, that shutter is closed, and the next steps in the program represented by FIG. 9 are to increase e by one and then to compare e to E to determine if recording medium 132 has been exposed to the desired number of diffraction patterns. If e is less than E, the program returns to step 5 and continues again therefrom. On the other hand, if e is equal to E at step 12, which indicates that the desired number of exposures have been made on recording medium 132, then gate 144 and mask 130 are returned to their initial positions and the program terminates.

Subroutines may be used to produce the specific electric control signals to activate the stepper motors used in system 100. Also, subroutines may be developed to monitor the position of mask 130, gate 144, shutter 106, variable density filters 122 and 142, and other parameters of interest of system 100. The development and implementation of such subroutines are well within the ability of those of ordinary skill in the art.

With the above-described operation of system 100, recording medium 132 is exposed to reference and signal beams 114 and 116 for a length of time greater than the length of time needed to adjust properly the intensities of the reference and signal beams. For shorter exposure times, or for other reasons, it may be preferred to adjust the intensities of reference and signal beams 114 and 116 before exposing recording medium 132 to those beams, and system 100 may be modified in various ways to do this. For instance, a reference beam shutter (not shown) may be located in the path of reference beam 114, between sensor 180 and mirror 124, and a signal beam shutter (also not shown) may be positioned in the path of signal beam 116, between sensor 182 and gate 144. Shutter 106 may be opened and reference and signal beams 114 and 116 may be adjusted to obtain the desired intensity ratio while the reference and signal beam shutters are kept closed to prevent beams 114 and 116 from passing to recording medium 132. Once the desired intensity ratio is obtained, the reference and signal beam shutters are opened to expose recording medium 132 to reference and signal beams 114 and 116. In addition, it may be observed that sensors 180 and 182 do not have to be located in the paths of reference and signal beams 114 and 116 between beam splitter 112 and recording medium 132. Instead, for example, the reference and signal beams may be temporarily deflected onto temporary paths (not shown) that do not lead to recording medium 132, and sensors 180 and 182 may be positioned in these temporary paths to sense the intensities of the reference and signal beams.

Figure 10:
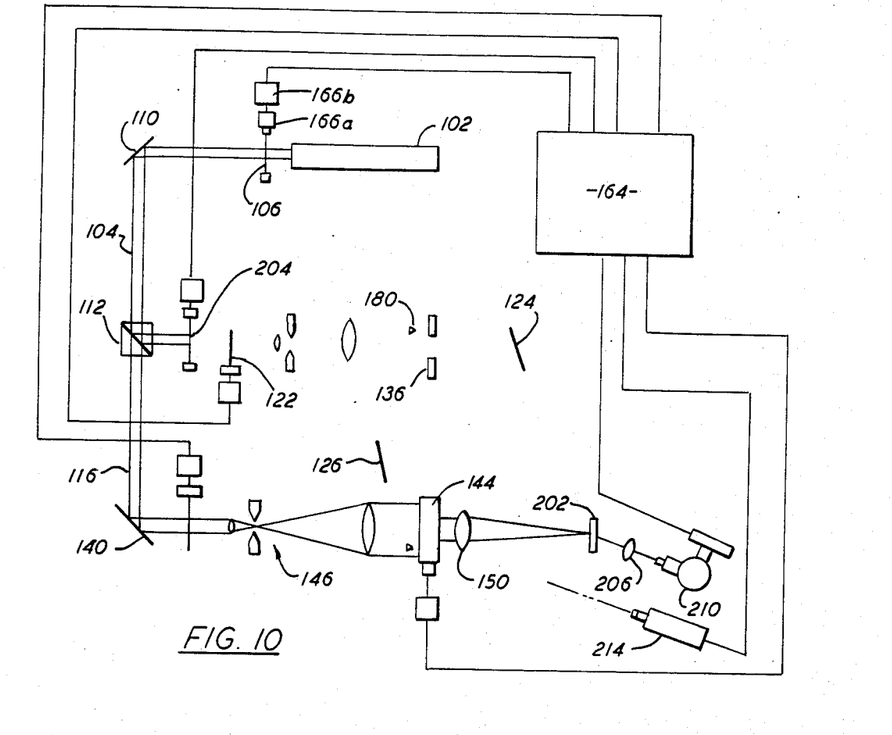
FIG. 10 shows an optical correlator system made from the system of FIG. 1.

FIG. 10 shows an optical correlator system 200 that may be easily made from system 100, and that is designed to use a matched filter manufactured in the latter system. To form system 200 from system 100, mask 130 is removed, matched filter 202, having an array of optical memories representing a selected target or targets, is substituted for recording medium 132, and gate 144 is provided with a plurality of scenes that may have the selected target or targets. Also, reference beam shutter 204 is located in the path of reference beam 114, inverse transform lens 206 is positioned in the path of the output beam of filter 202, and optical detector 210 is located at the focal point of the inverse transform lens. System control means 164 may be connected to shutter 204 and detector 210 to control movement or operation thereof.

In the operation of system 200, source beam 104 is generated by laser 102, directed through shutter 106 and reflected by mirror 110 to beam splitter 112, which splits the source beam into reference and signal beams 114 and 116. Shutter 204 is normally kept closed to block reference beam 114 from passing further through system 200; however, signal beam 116 is reflected off mirror 140 and then directed through filter 142 and gate 144. Gate 144 is operated to expose a plurality of scenes, one at a time, and which may or may not include a selected target, to the signal beam to spatially modulate that beam. Beam expansion means 146 may be located in the path of signal beam 116 to insure that the complete area of the scene on the gate is illuminated by the signal beam.

The modulated beam from gate 144 is then directed to multiple beam generating holographic lens 150, and the output of this lens is a matrix of individual beams each of which is spatially modulated in the same way as the beam incident on the lens. These matrix beams have parallel axes, and each beam of the matrix converges toward and passes through a different diffraction pattern on filter 202 and is deflected thereby toward lens 206 and detector 210. One or more of the beams passing through matched filter 202 may become collimated thereby; and if this is the case, inverse transform lens 206 focuses that collimated beam or beams on detector 210, triggering an alarm signal. However, if none of the beams passing through filter 202 becomes collimated, the output beams of matched filter 202 are all relatively weak and diffused, and they remain diffused as they pass through inverse transform lens 206.

Figure 11:
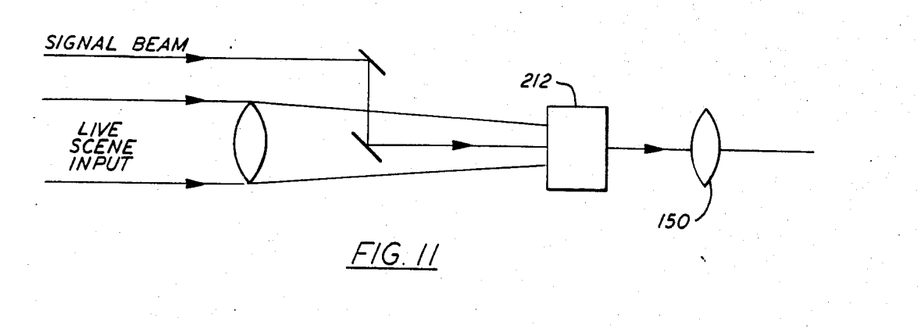
FIG. 11 shows a spatial light modulator that may be used in the system of FIG. 10.

System 200 may be used in a number of different modes of operation. For example, system 200 may be operated to detect the presence of a selected target in a submitted scene substantially independent of the particular view of the target that may be in that scene; and to do this, system 200 is provided with a matched filter 202 having a multitude of holograms corresponding to different views of the selected target. With such a matched filter 202, if the selected target is not in the scene presented to signal beam 116, then the output beams of the matched filter are relatively weak and diffused. If the selected target is in the submitted scene, however, the light beam traversing the particular hologram on filter 202 that corresponds to the view of the target in the submitted scene becomes collimated, and inverse transform lens 206 focuses that collimated beam on detector 310. System 200 may be used to detect the presence of a target in a live scene by substituting a spatial light modulator 212, as shown in FIG. 11, for gate 144. The live scene is imaged on modulator 212 and signal beam 116 is transmitted through the modulator and then to lens 150.

As previously mentioned, reference beam 114 is not normally used during the operation of system 200, however that beam may be helpful in positioning lens 206 and detector 210. To elaborate, if matched filter 202 used in system 200 is made in system 100, and if system 200 is formed from system 100 as described above, then the path of the output beams of the matched filter is aligned with the path of reference beam 114 as it would be reflected off mirror 126. Thus, lens 206 and detector 210 may be easily positioned in system 200, or their position in the system may be checked, by opening reference beam shutter 204 prior to inserting matched filter 202 in system 200, and simply aligning lens 206 and detector 210 with the path of reference beam 114 reflected off mirror 126.

System 200 may be provided with a camera 214, which may be connected to and controlled by system control means 164, to facilitate visual observation of the scene being presented to signal beam 116 by gate 144. It may also be noted that, to facilitate switching between operation of systems 100 and 200, it may be desirable to provide system 100 with reference beam shutter 204. If this is done, shutter 204 may be kept open during operation of system 100 whenever shutter 106 is open, so that shutter 204 does not interfere with the passage of reference beam 114 to recording medium 132.

Figure 12:
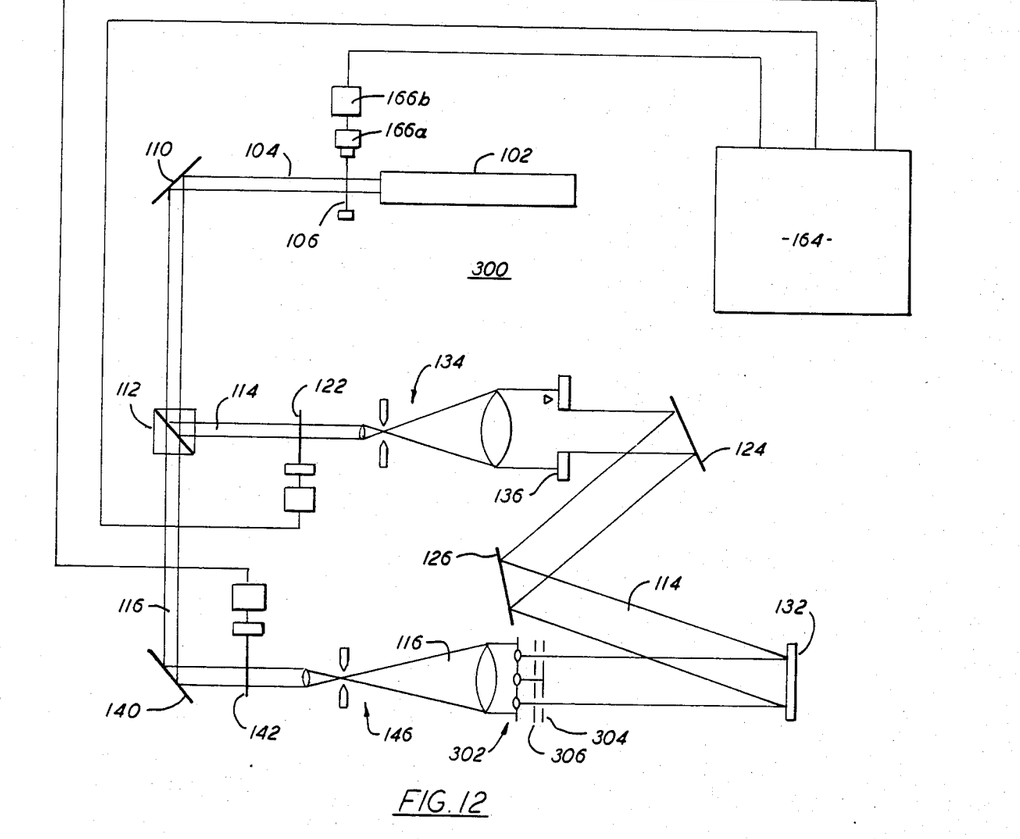
FIG. 12 shows a modification of the system shown in FIG. 1 for manufacturing a multiple array holographic lens.
Figure 13:
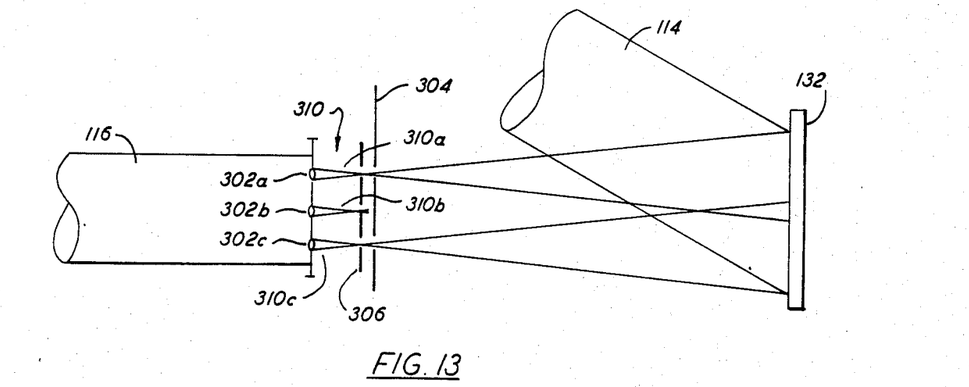
FIG. 13 shows a portion of the system of FIG. 12 in greater detail.

System 100 can also be used, with slight modifications, to make automatically a multiple array holographic lens, and FIGS. 12 and 13 illustrate such a modified system, identified by the reference numeral 300. To form system 300 from system 100, an array 302 of individual lenses 302a–c is substituted for lens means 150, a flat apertured mask 304 is substituted for mask 130 and located outside the path of reference beam 114, and an apertured filter 306 is added between lens array 302 and mask 304. Lens array 302 may also comprise a multitude of individual glass lenses, or a multitude of individual holographic fly's eye lenses. In addition, the signal beam of system 300 is not spatially modulated, and thus gate 144 may be removed. Alternately, gate 144 may be left in system 300, but moved to a position where it does not spatially modulate the signal beam. Preferably, all the other elements of system 100 are used in system 300, and like components of the two systems are given like reference numerals.

In the operation of system 300, source beam 104 is generated by laser 102, directed through shutter 106 and reflected by mirror 110 to beam splitter 112, which splits the source beam into reference and signal beams 114 and 116. The former beam is directed through filter 122, and reflected by mirrors 124 and 126 onto recording medium 132. Signal beam 116 is reflected off mirror 140 and then directed through filter 142 and to lens array 302. Means 134, 136 and 146 may be located in the paths of the references and signal beams to adjust the sizes thereof.

The output of lens array 302 is a series 310 of individual beams 310a–c, each of which focuses to a point at a different one of the openings of filter 306 so that, in effect, this filter acts as a multiple point light source. Selected beams from filter 306 pass through the apertures in mask 304 and onto recording medium 132, where those light beams interfere with reference beam 114 to form holograms of point sources. For purposes of explaining the operation of system 300, lens array 302 is shown as a 1×3 matrix of lenses, and the output thereof is a 1×3 matrix of beams 310, but this is not to be considered as a limitation of the present invention. Furthermore, as depicted in FIGS. 12 and 13, mask 304 has two apertures for passing beams of matrix 310 therethrough; although, as will be understood by those of ordinary skill in the art, the mask may have fewer or more apertures.

Stepper motors (not shown) are employed to move mask 304 automatically through a plurality of positions in a preset sequence to pass the light beams of array 310 through mask 304 and onto recording medium 132 to record a number of diffraction patterns thereon, and in this way fabricate a multiple array holographic lens. These stepper motors, in turn, may be operated in accordance with a preset program, by electronic controls (not shown) and system control means 164.

As will be appreciated, shutter 106, filters 122 and 142, and sensors 180 and 182 are not necessary to the operation of system 300. These elements, however, help to operate system 300 quickly and precisely and help to obtain optimum results; and hence, preferably these elements are included in system 300 and they operate therein in the same way in which they operate in system 100.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A system for automatically fabricating multi-hologram optical elements, comprising:

means for forming signal and reference beams of phase-related coherent radiation, and directing the signal beam along a first path and the reference beam along a second path, said first and second paths intersecting at a recording plane;

an optical recording medium located at the recording plane;

gate means located in the path of the signal beam to expose a plurality of views to the signal beam to spatially modulate said signal beam;

holographic lens means located in the path of the signal beam, between the gate means and the recording medium, to generate a matrix of beams from the signal beam, each of said matrix of beams converging toward a different area on the recording medium;

a mask located in the path of the matrix beams, between the holographic lens means and the recording medium, and including a control aperture to pass one of the matrix beams through the mask and onto the recording medium to record thereon the diffraction pattern produced by the interference between the one matrix beam and the reference beam;

mask positioning means to move the mask through a plurality of positions in a first sequence to pass the matrix beams through the control aperture and onto the recording medium to record a plurality of diffraction patterns on different areas thereof, gate positioning means to move the gate through a plurality of positions in a second sequence to expose the plurality of views, one at a time, to the signal beam; and system control means connected to and actuating the mask positioning means and the gate positioning means to move the gate to different positions in the seocnd sequence at predetermined times in the first sequence.

2. A system according to claim 1 wherein the system control means actuates the mask positioning means and the gate positioning means to move the gate to a different position in the second sequence each time the mask is moved to a different position in the first sequence.

3. A system according to claim 2 wherein:

the mask passes the matrix beams one at a time through the control aperture and onto the recording medium; and the mask blocks from the recording medium all but the one matrix beam passing through the control aperture.

4. A system according to claim 1 further comprising:

shutter means having a closed position to prevent the reference and signal beams from passing to the recording medium, and an open position to expose the recording medium to the reference and signal beams; and shutter control means connected to the shutter means to move the shutter means between the open and closed positions.

5. A system according to claim 4 wherein:

the system control means is connected to and actuates the shutter controls means to move the shutter means between the open and closed positions according to a preset program;

the system control means actuates the mask positioning means to move the mask between positions in the first sequence when the shutter means is in the closed position; and the system control means actuates the gate positioning means to move the gate between positions in the second sequence when the shutter means is in the closed position.

6. A system according to claim 5 wherein:

the means for forming the signal and reference beams includes
(i) means for generating a source beam, and
(ii) means for splitting the source beam into the signal and reference beams; and the shutter means is located in the path of the source beam, between the generating means and the splitting means.

7. A system according to claim 1 wherein:

the matrix of beams includes a plurality of horizontally spaced columns of beams, each column including a plurality of vertically spaced beams; and the mask positioning means includes means to move the mask vertically and horizontally to align the control aperture with each of the matrix beams, one at a time.

8. A system according to claim 1 wherein:

the gate is a rotary gate including a window supported for rotation about an axis; and the gate positioning means includes means to rotate the window about said axis through a plurality of discrete angular steps.

9. A system according to claim 8 wherein said discrete steps are all angularly equal.

10. A system according to claim 1 wherein:

the gate includes a film supported for movement across the signal beam; and the gate positioning means includes means to move the film through discrete steps across the path of the signal beam to expose the plurality of views one at a time to the signal beam.

11. A system according to claim 1 further including means to vary the intensity of at least one of the signal and reference beams.

12. A system according to claim 11 wherein the means to vary the intensity includes:

a variable density filter having a portion thereof located in the path of said one beam; and filter control means connected to the variable density filter to move the filter and change the portion thereof that is located in the path of said one beam.

13. A system according to claim 12 wherein:

the means to vary the intensity further includes
(i) a first sensor located in the path of the reference beam to sense the intensity thereof and generate a first signal representing the magnitude of the intensity of the reference beam, and
(ii) a second sensor located in the path of the signal beam to sense the intensity thereof and generate a second signal representing the magnitude of the intensity of the signal beam; and the system control means is connected to the first and second sensors to receive the first and second signals therefrom, and is connected to the filter control means to actuate the filter control means and adjust the intensity of said one beam so that the ratio of the intensities of the reference and signal beams equals a predetermined value.

14. A method for recording multiple holograms on an individual recording medium, comprising:
   forming signal and reference beams of phase-related coherent radiation;
   directing the signal beam along a first path and the reference beam along a second path;
   intersecting the first and second paths at the recording medium;
   passing the signal beam through a gate to expose a plurality of views to the signal beam to spatially modulate the signal beam;
   generating a matrix of beams from the spatially modulated signal beam, each of the matrix beams converging toward a different area on the recording medium; passing the matrix beams through sands mask and onto the recording medium to record a plurality of diffraction patterns on different areas of the recording medium;
   generating a first control signal to move the mask through a plurality of positions in a first sequence to pass the matrix beams through the mask and onto the recording medium;
   generating a second control signed to move the gate through a plurality of positions in a second sequence to expose the plurality of views one at a time to the signal beam; and
   coordinating the first and second control signals to move the gate to different positions in the second sequence at predetermined times in the first sequence.

15. A method according to claim 14 wherein the step of passing the matrix beams includes the step of passing a different matrix beam onto the recording medium each time a different view is exposed to the signal beam.

16. A method according to claim 15 wherein the step of passing the matrix beams includes the step of passing the matrix beams one at a time onto the recording medium.

17. A method according to claim 14 further comprising the step of preventing the reference and signal beams from passing to the recording medium during selected periods, and wherein:
   the step of generating the second control signal includes the step of moving the gate during the selected periods to change the view exposed to the signal beam; and
   the step of generating the first control signal includes the step of moving the mask during the selected periods to change the matrix beam passed onto the recording medium.

18. A method according to claim 17 wherein:
   the forming step includes the steps of
   (i) generating a source beam, and
   (ii) splitting the source beam into the reference and signal beams;
   the optical recording system has a shutter in the path of the source beam;
   the directing step includes the step of opening the shutter for a predetermined length of time;
   the preventing step includes the step of closing the shutter after the predetermined length of time; and
   the method further comprises repeating the steps of opening and closing the shutter.

19. A method according to claim 14 further comprising the step of adjusting the relative intensities of the reference and signal beams so that the ratio of those intensities equals a preset value.

20. A method according to claim 14 wherein:
   the mask has a control aperture for passing the matrix beams onto the recording medium;
   the step of generating the matrix of beams includes the step of generating a plurality of horizontally spaced columns of beams, each column including a plurality of vertically spaced beams; and
   the step of generating the first control signal includes the steps of
   (i) vertically aligning the control aperture with a first of the plurality of columns of beams,
   (ii) then vertically moving the mask to pass the beams of said first column one at a time through the control aperture and onto the recording medium,
   (iii) then horizontally moving the mask to align the control aperture with a second of the plurality of columns of beams; and
   (iv) then vertically moving the mask to pass the beams of said column, one at a time, through the control aperture and onto the recording medium.

21. A system for automatically fabricating a multiple array holographic lens, comprising:
   means for forming signal and references beams of phase-related coherent radiation, and directing the signal beam along a first path and the reference beam along a second path, said first and second paths intersecting at a recording plane;
   an optical recording medium located at the recording plane;
   generating means located in the path of the signal beam to generate therefrom a matrix of point light sources directed toward the recording medium;
   a mask located between the generating means and the recording medium, and including at least one control aperture to pass light from at least one of the light sources through the mask and onto the recording medium to record the diffraction pattern produced by the interference between the reference beam and light from the one light source;
   mask positioning means to move the mask through a plurality of positions to pass light from a plurality of the point light sources through the control aperture and onto the recording medium to record a plurality of diffraction patterns thereon; and
   system control means connected to and actuating the mask positioning means to move the mask through said plurality of positions in a preset sequence.

22. A system according to claim 21, further comprising:
   shutter means having a closed position to prevent the reference and signal beams from passing to the recording medium, and an open position to expose the recording medium to the reference and signal beams; and
   shutter control means connected to the shutter means to move the shutter means between the open and closed positions; and wherein:
   the system control means is connected to and actuates the shutter controls means to move the shutter means to the closed position at predetermined times and for predetermined periods; and
   the system control means actuates the mask positioning means to move the mask between positions in the preset sequence during said predetermined periods.

23. A system according to claim 22 further comprising:
  a filter located in the path of a selected one of the reference and signal beams to control the intensity of the selected beam;
  filter control means connected to the filter to adjust the filter and vary the intensity of the selected beam;
  a first sensor located in the path of the reference beam to generate a first signal representing the magnitude of the intensity of the reference beam; and
  a second sensor located in the path of the signal beam to generate a second signal representing the magnitude of the intensity of the signal beam; and
  wherein the system control means is connected to the first and second sensors to receive the first and second signals therefrom, and is further connected to and actuates the filter control means to adjust the intensity of the selected beam so that the ratio of the intensities of the reference and signal beams equals a predetermined value.

* * * * *

UNITED STATES PATENT AND TRADEMARK OFFICE
CERTIFICATE OF CORRECTION

PATENT NO. : 4,703,994

DATED : November 3, 1987

INVENTOR(S) : Kenneth G. Leib

It is certified that error appears in the above-identified patent and that said Letters Patent is hereby corrected as shown below:

Column 15, Claim 1, line 45: "seocnd" should read as --second--

Column 17, Claim 14, line 18: "through sands mask" should read as --through a mask--

Signed and Sealed this

Thirty-first Day of May, 1988

Attest:

DONALD J. QUIGG

*Attesting Officer*

*Commissioner of Patents and Trademarks*